United States Patent [19]

Albrecht et al.

[11] 4,155,441

[45] May 22, 1979

[54] APPARATUS FOR COUNTING AND GROUPING ARTICLES

[75] Inventors: Robert J. Albrecht, River Edge; Albert A. Pinto, White Plains; John J. Palermo, Glen Rock; Edward J. Mystowski, Westwood, all of N.J.

[73] Assignee: Nabisco, Inc., East Hanover, N.J.

[21] Appl. No.: 794,266

[22] Filed: May 5, 1977

[51] Int. Cl.$^2$ ............................................... B65G 47/26
[52] U.S. Cl. ...................................... 198/424; 198/431
[58] Field of Search ............... 198/424, 425, 431, 812, 198/503

[56] References Cited

U.S. PATENT DOCUMENTS

| | | | |
|---|---|---|---|
| 2,827,150 | 3/1958 | Eaton et al. | 198/424 |
| 3,357,154 | 12/1967 | Florian | 198/424 |
| 3,460,667 | 8/1968 | Lanham, Jr. | 198/812 |
| 3,556,280 | 1/1971 | Schnee et al. | 198/431 |
| 3,717,751 | 2/1973 | Fluck | 198/503 |

Primary Examiner—Robert B. Reeves
Assistant Examiner—Jeffrey V. Nase
Attorney, Agent, or Firm—Gerald Durstewitz; Paul E. O'Donnell, Jr.

[57] ABSTRACT

A conveyor system for grouping columns of articles into spaced group each containing a predetermined number of articles. The columns of articles are fed onto a conveyor having an extendable noser arrangement at the output end which is positioned over the input end of a second conveyor. The noser arrangement is extended to interrupt the flow of articles from the first conveyor to the second conveyor and provide a space on the second conveyor between successive groups of articles. The articles are transferred to the second conveyor as the noser arrangement retracts. A photo-electric device counts the articles as they are transferred and actuates the noser extending mechanism when the predetermined count is reached.

4 Claims, 15 Drawing Figures

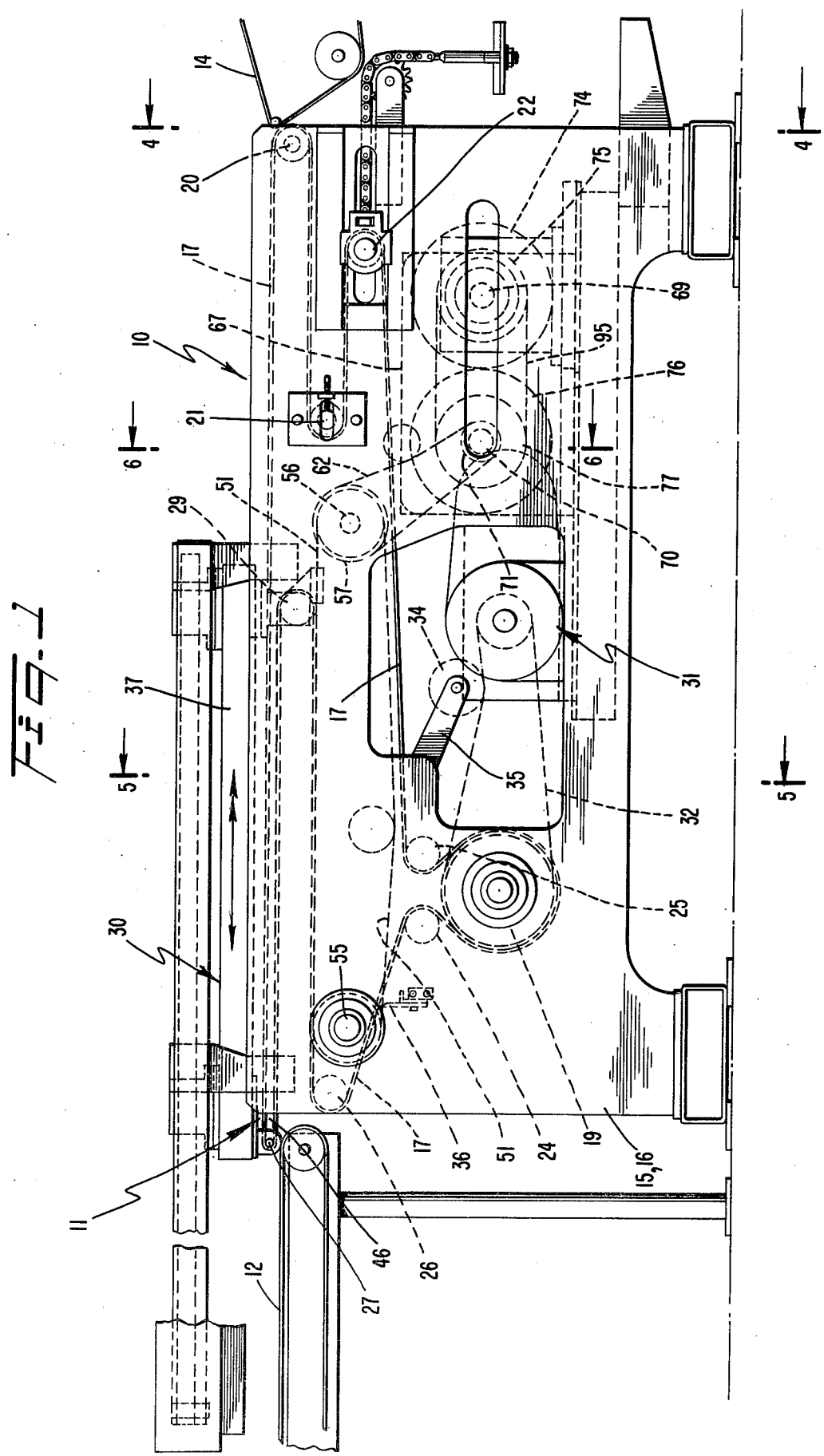

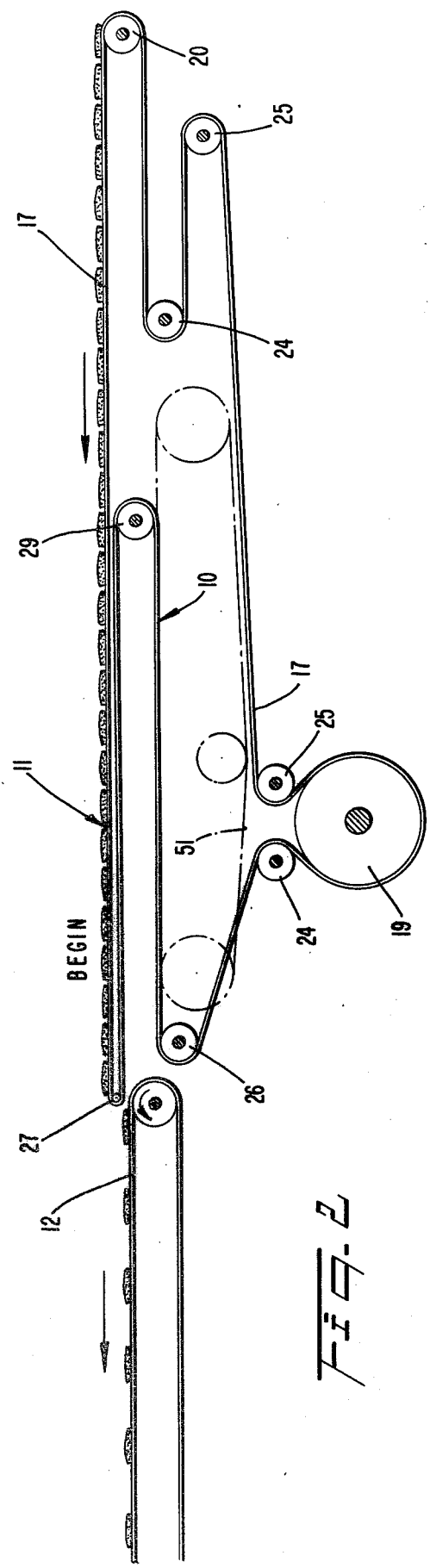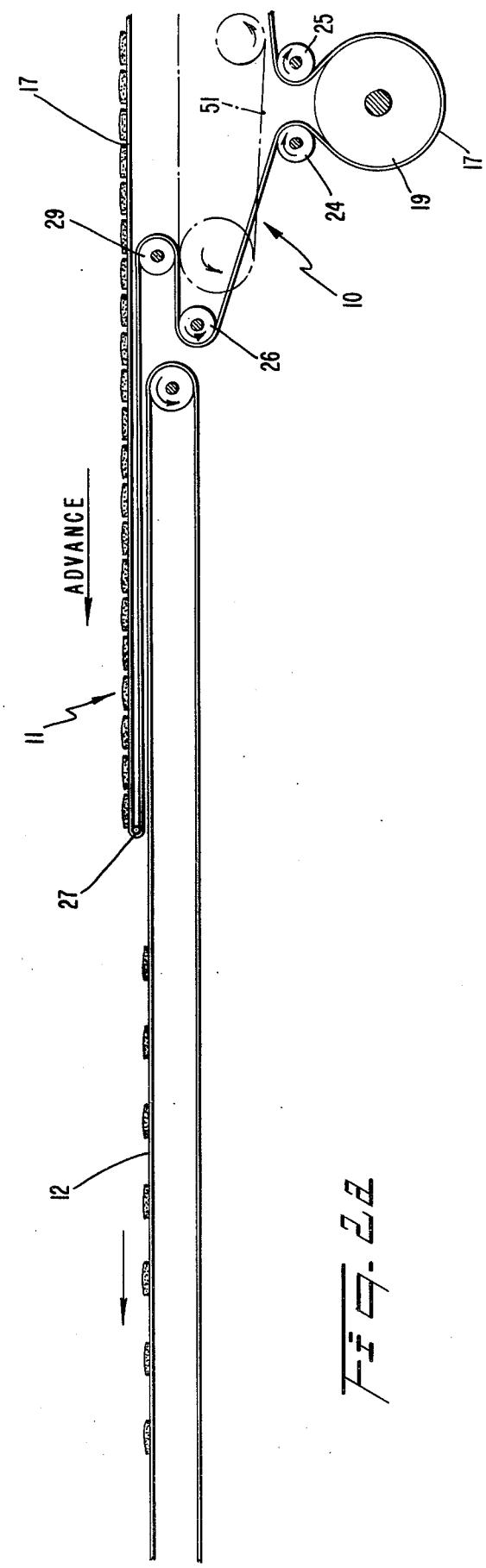

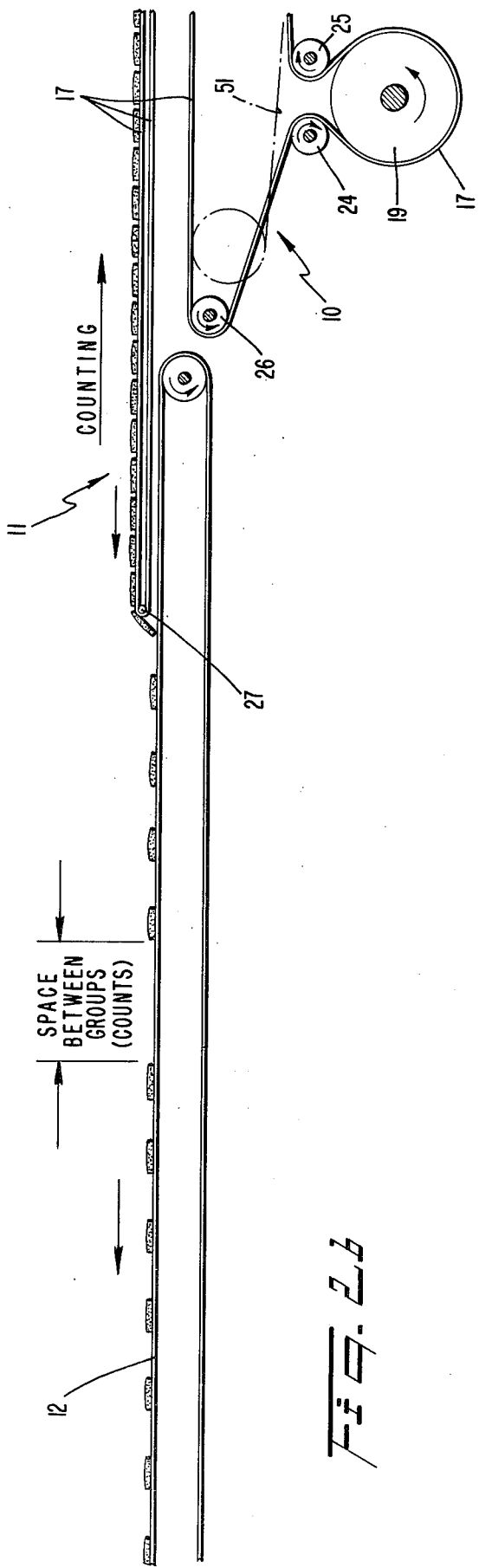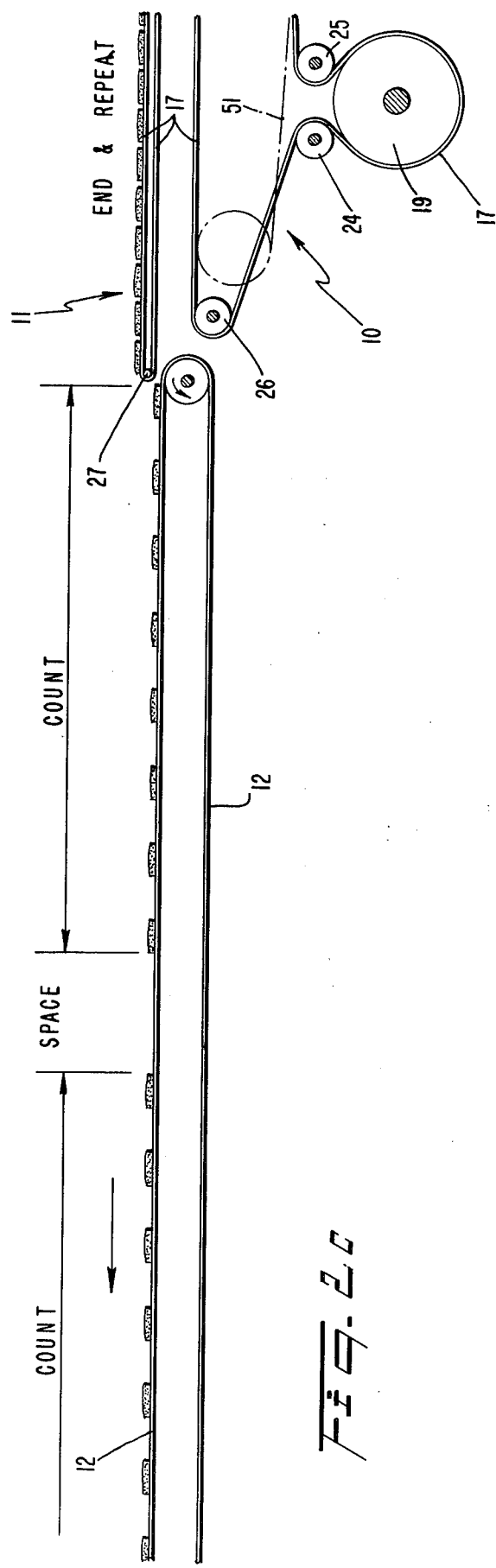

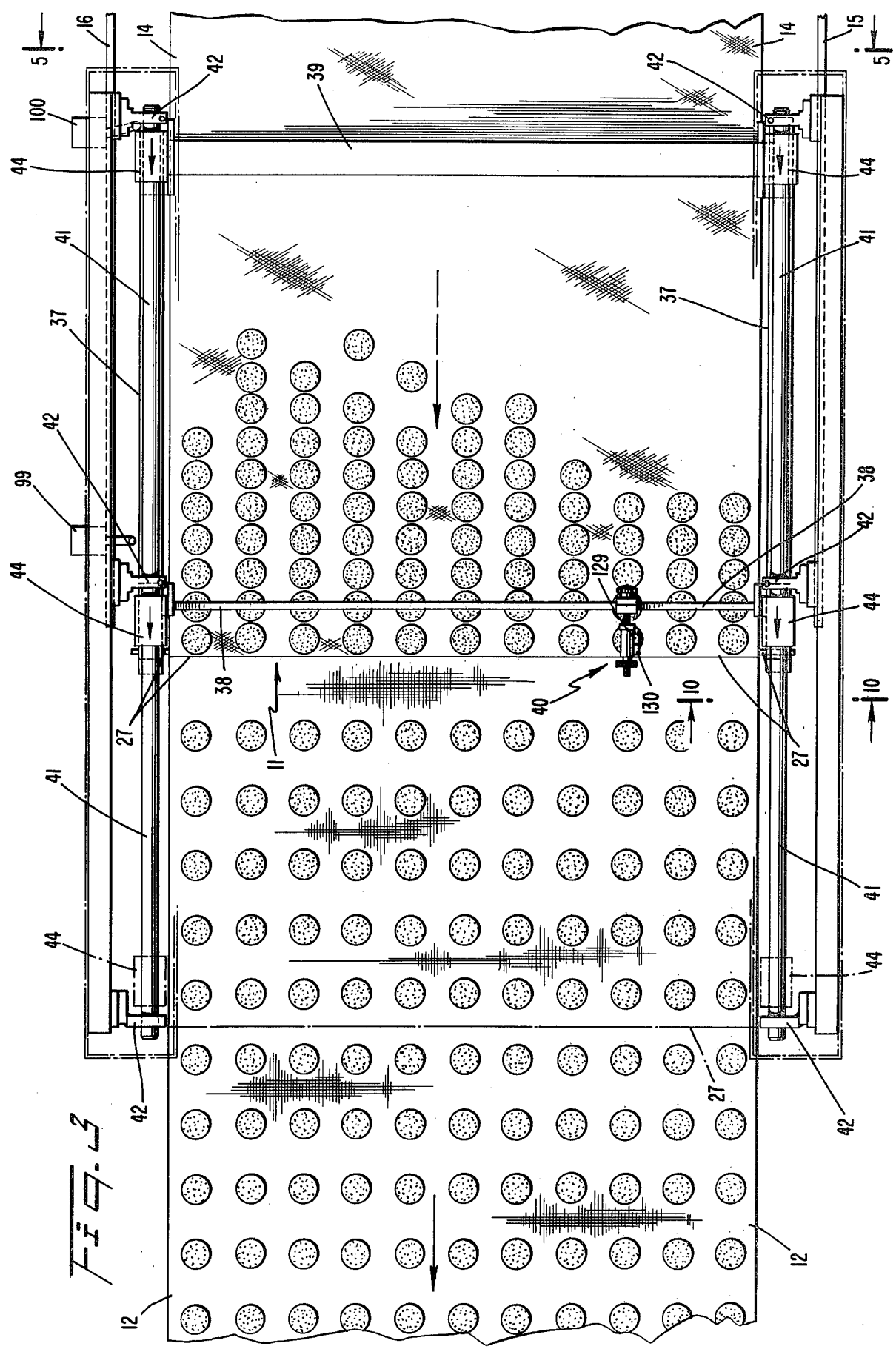

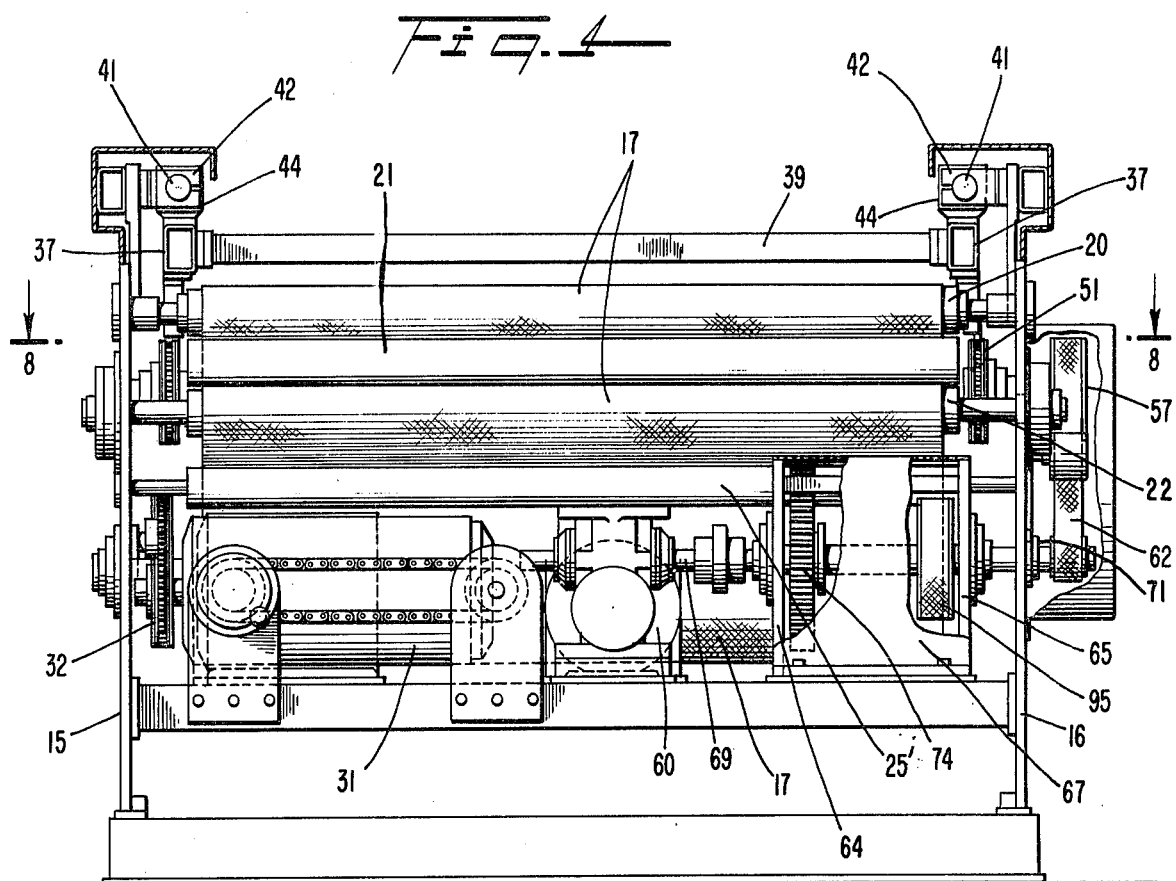
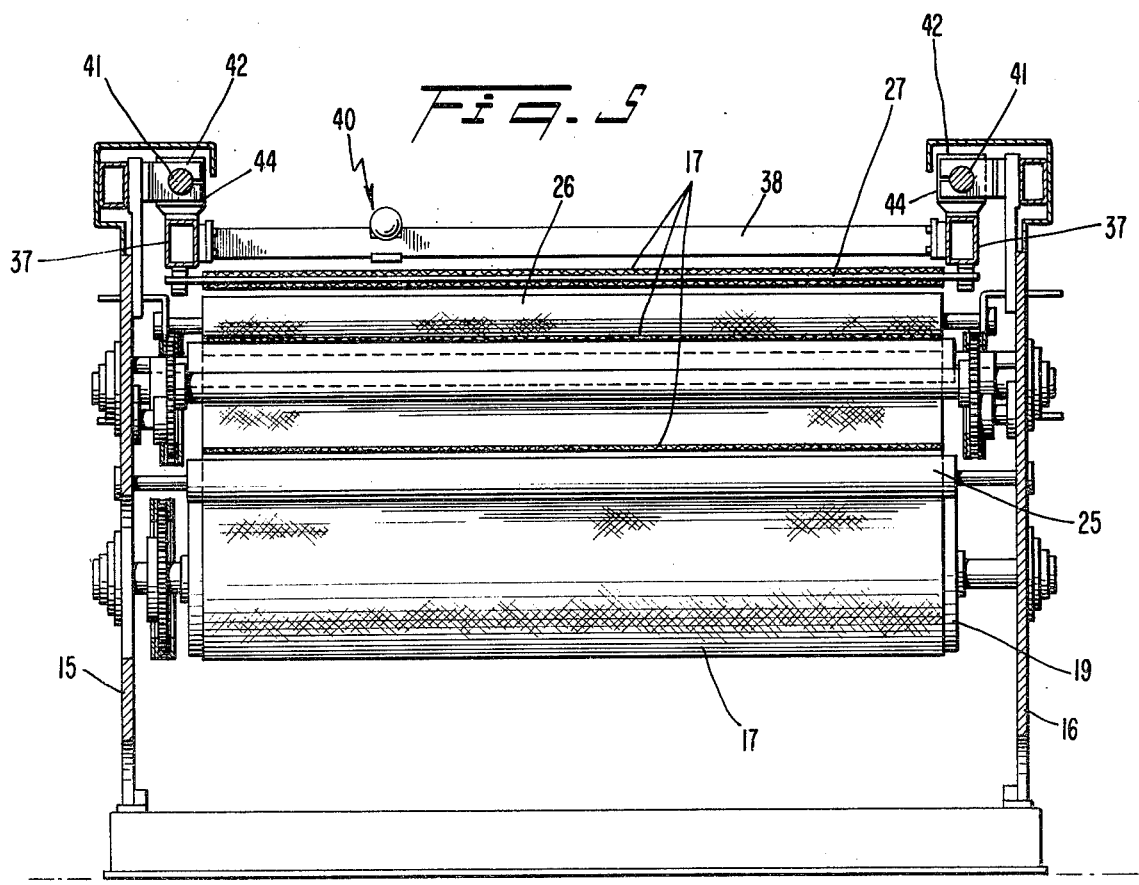

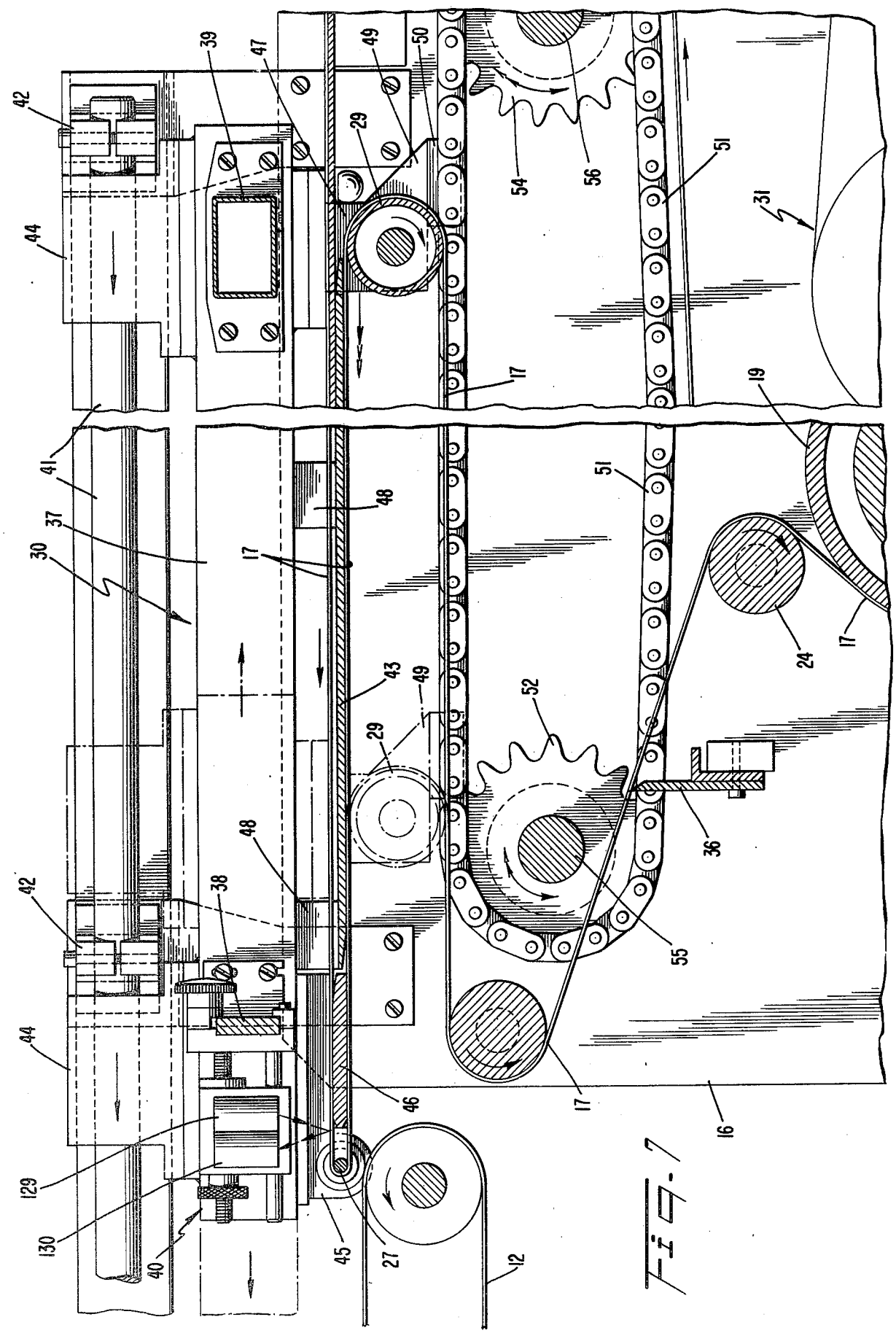

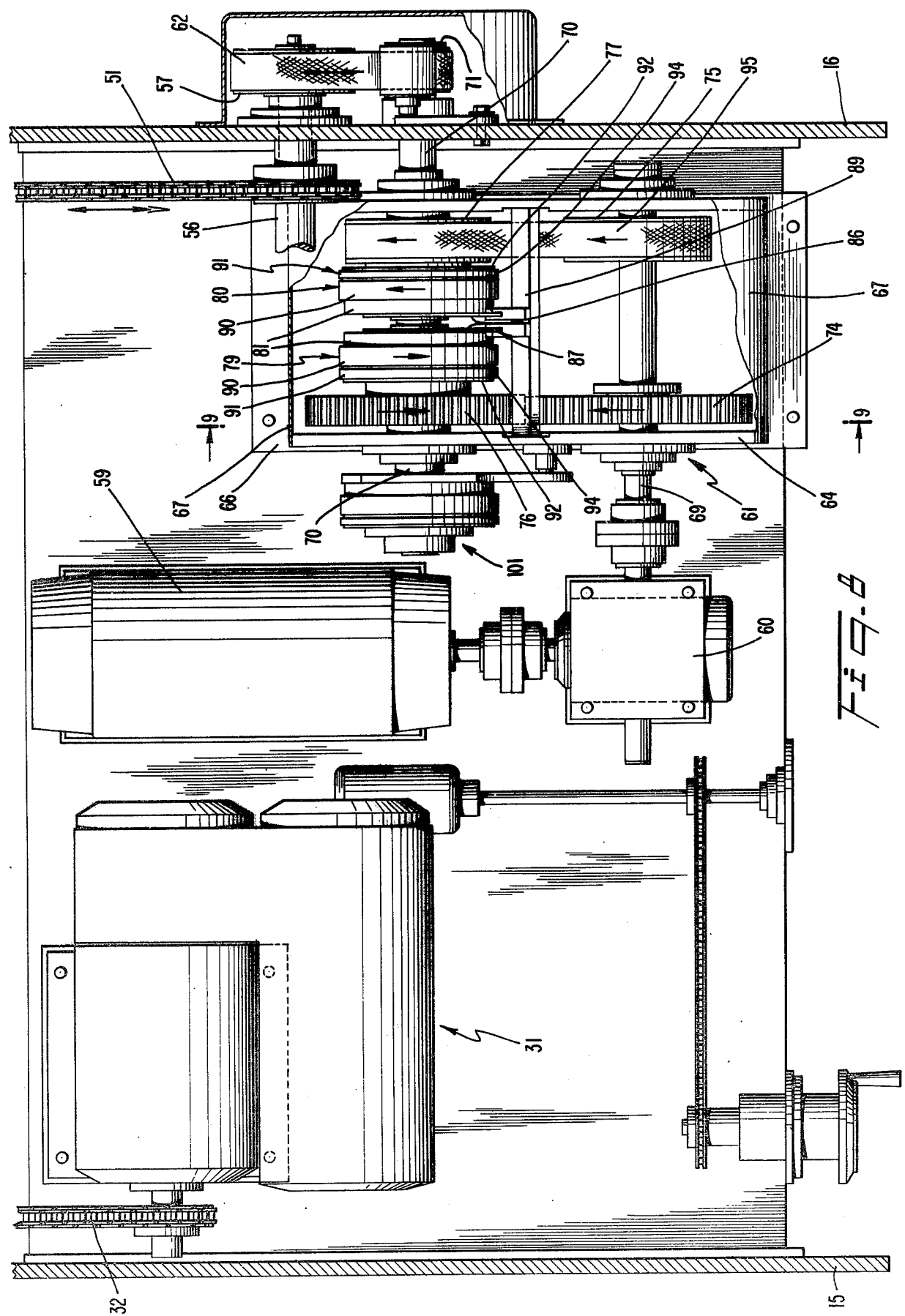

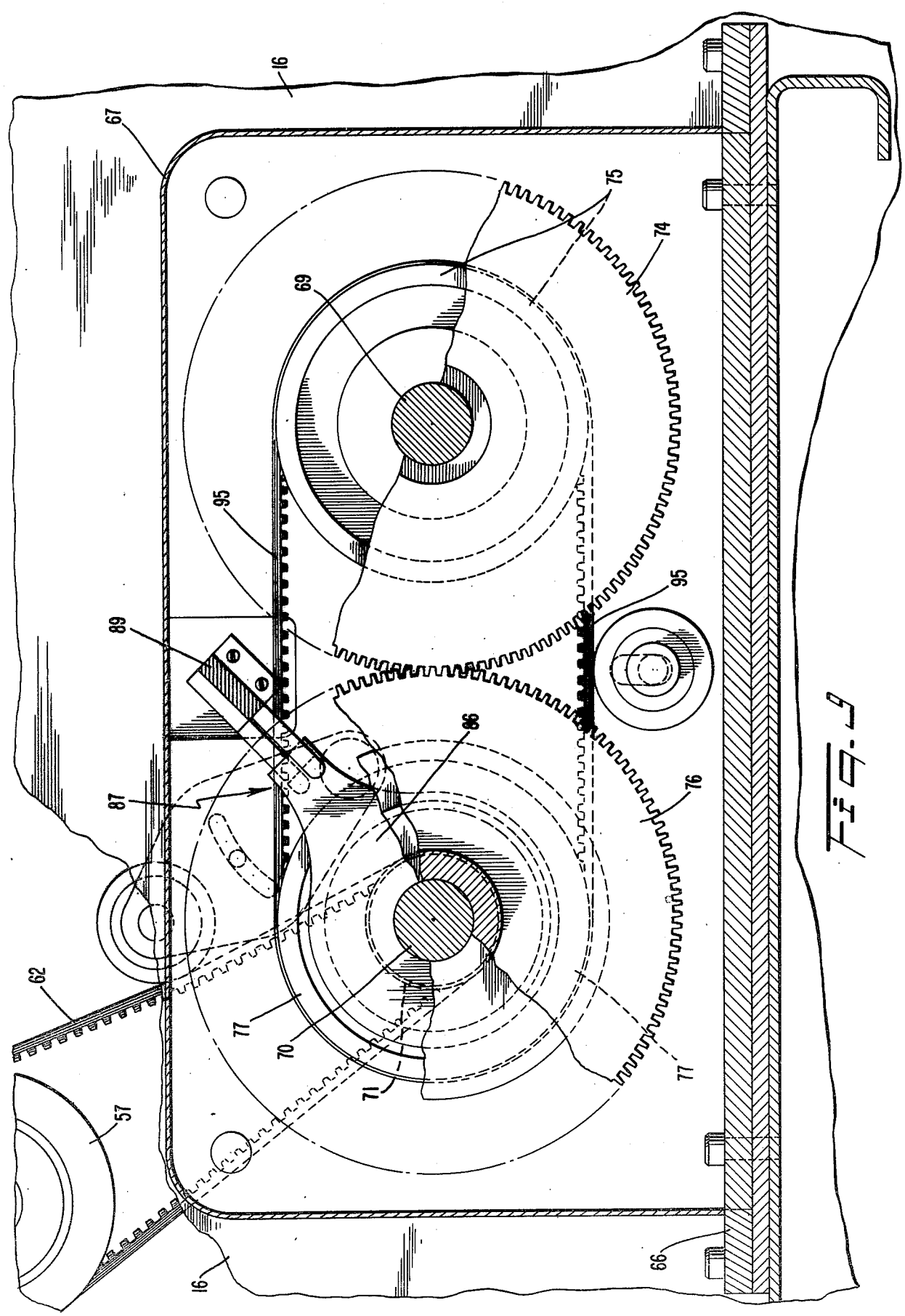

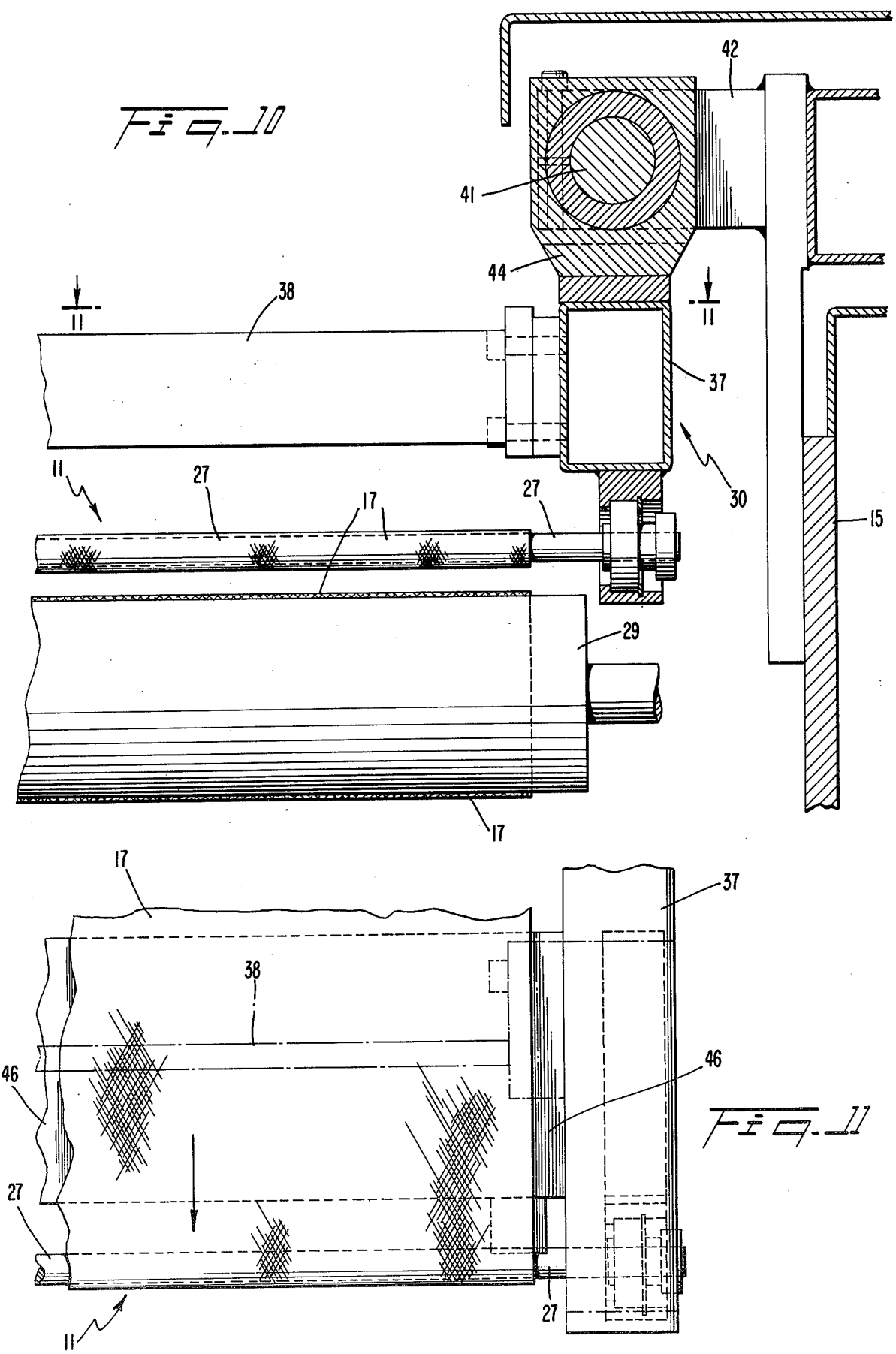

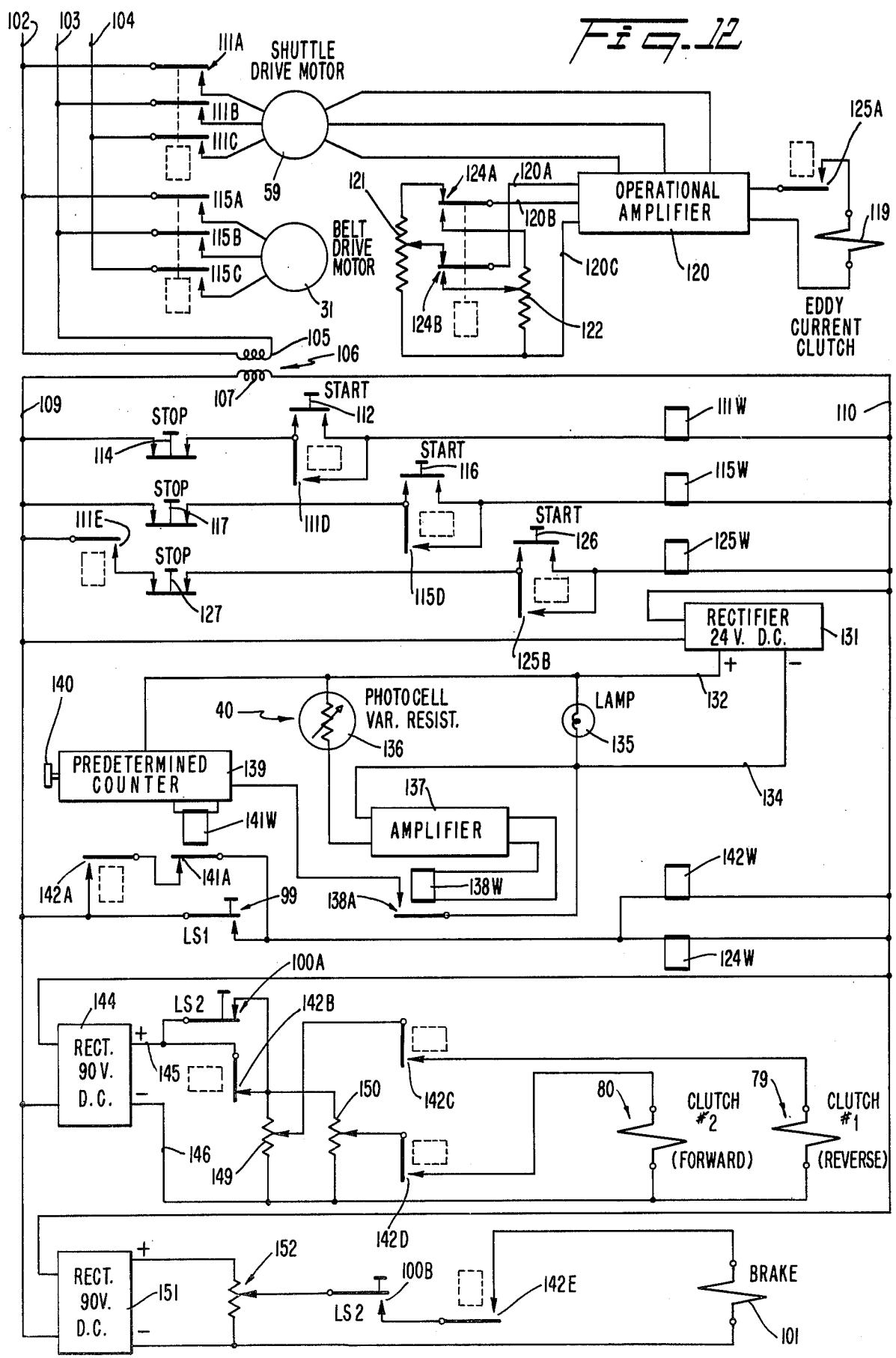

APPARATUS FOR COUNTING AND GROUPING ARTICLES

BACKGROUND OF THE INVENTION

The present invention relates to the counting and grouping of articles and more particularly, to conveyor systems for separating continuous columns of articles into spaced groups each group containing a predetermined number of articles.

In the manufacture of cookies, the dough pieces and the baked cookies are arranged on conveyor belts in continuous rows which extend axially along the belts. During the manufacturing process, the product pieces are carried in turn by a number of conveyors each conveyor maintaining the cookies in unbroken columns. Cookies which are by nature of uniform weight can be packaged automatically by machinery which counts out a predetermined number of cookies from an edge stacked column and automatically transfers that group of cookies into a package which is automatically passed through a sealing mechanism.

Those cookies which are not of uniform nature are conventionally packaged in two ways. They can be packaged loose in random orientation in either bags or boxes or they can be stacked in one or more columns within a package. The packaging of bags or boxes with randomly oriented cookies is easily accomplished by currently available fully automated machinery. However, filling packages with stacks of cookies, where the individual cookies vary in weight, must be done manually to insure that the package weight meets but does not greatly exceed the desired weight. The normal practice has been to shingle the continuous columns of cookies so that they overlap each other, and to station workers alongside the conveyors to count off and pick up groups of cookies and manually stack the cookies in the packages. The number of cookies designated for each stack was selected so that the packages would normally tend to be somewhat below the desired weight. The packages, still open, are then transferred to another station where a second operator weighs the package and adds an additional cookie if it is necessary to bring the package up to the listed weight. It has been found in actual practice that the operators do not count off the right number of cookies for each stack, the stacks sometimes containing too many and at other times, far too few cookies. The operation at the following station is therefore slowed down. The second operator instead of merely checking the scale to see whether a single cookie must be added, has to add or subtract a number of cookies on a trial basis which can be time consuming.

SUMMARY OF THE INVENTION

It is, therefore, an object of the present invention to provide a means of facilitating the hand packaging of articles.

Another object is to automatically count and group articles.

Another object is to separate columns of articles on a conveyor into spaced groups, each group containing the same number of articles.

The foregoing objects are accomplished by providing apparatus comprising a first conveyor receiving columns of articles at the input end and having an extendable noser arrangement at the output end, a second conveyor aligned with the first conveyor and having its input end positioned under the noser arrangement to receive articles therefrom, means for counting the articles transferred, and means for cyclically extending the noser arrangement to prevent the transfer of articles to the second conveyor and, thus, create a vacant space on the second conveyor and for retracting the noser arrangement until a predetermined number of articles are transferred.

BRIEF DESCRIPTION OF THE DRAWINGS

A preferred embodiment of the invention has been chosen for the purposes of illustration and description, and is shown in the accompanying drawings, forming a part of the specification, wherein:

FIG. 1 is a side elevational view of apparatus for counting and grouping articles in accordance with the present invention.

FIG. 2 is a schematic side elevational view of the apparatus shown in FIG. 1 at the beginning of a counting and grouping cycle.

FIG. 2a is a schematic view similar to FIG. 2 showing the condition of the apparatus at the end of the spacing portion of the operational cycle.

FIG. 2b is a schematic view similar to FIGS. 2 and 2a showing the counting portion of the operational cycle.

FIG. 2c is a schematic view similar to FIGS. 2, 2a and 2b showing the condition of the apparatus at the end of the counting portion of the operational cycle.

FIG. 3 is a top plan view of the apparatus shown on FIG. 1.

FIG. 4 is a transverse sectional view taken along line 4—4 in FIG. 1.

FIG. 5 is a transverse sectional view taken along line 5—5 on FIG. 1.

FIG. 7 is a longitudinal sectional view taken along line 7—7 on FIG. 6.

FIG. 8 is a longitudinal sectional plan view taken along line 8—8 on FIG. 4.

FIG. 9 is a longitudinal sectional view taken along line 9—9 on FIG. 8.

FIG. 10 is a transverse sectional view taken along line 10—10 on FIG. 3.

FIG. 11 is a plan view taken along line 11—11 on FIG. 10.

FIG. 12 is a schematic diagram of the electrical drive and control system.

DETAILED DESCRIPTION OF THE INVENTION

Figure 6:
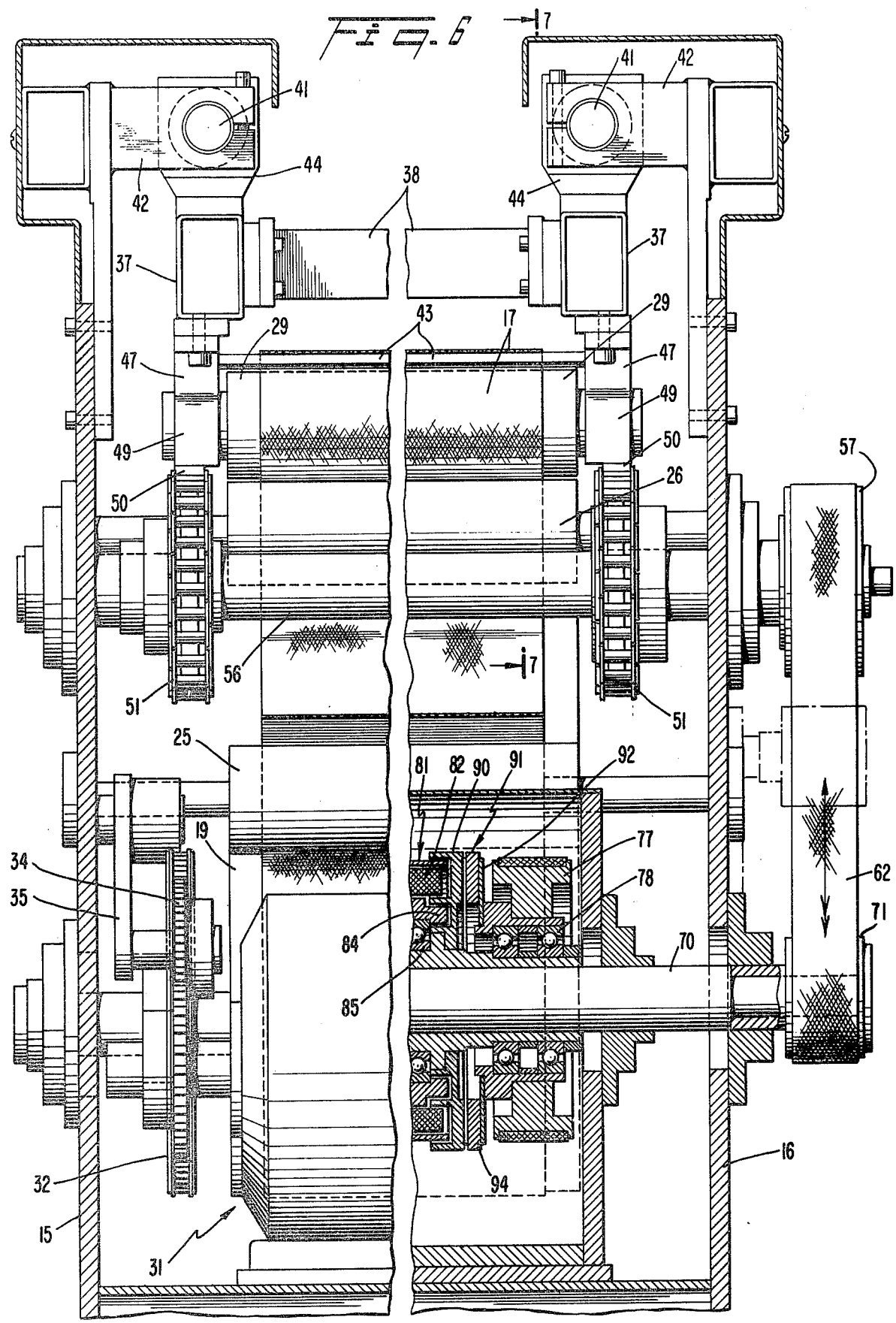
FIG. 6 is a transverse sectional view taken along line 6—6 on FIG. 2.

Referring now to the drawings in detail, there is shown apparatus according to the present invention for counting and grouping articles, such as cookies, transported on conveyor belts which generally comprises a first conveyor 10 having an extensible noser section 11, a second conveyor 12 for receiving articles from the first conveyor, means for counting the articles transferred from the conveyor 10 to the conveyor 12, and means for extending and retracting the noser section under the control of the counting means. The conveyor 10 receives columns of articles A from an infeed conveyor 14. These columns, as shown in FIG. 3, are parallel to each other and extend longitudinally with respect to the conveyor 10. The extension and retraction of the noser section 11 as the articles A are transferred from the noser section to the conveyor 12 causes the articles to be deposited on the conveyor 12 in longitudinally aligned groups, each group containing the same number of articles and being separated from the preceding and following groups.

Referring particularly to FIGS. 1 and 4–6, the conveyor 10 is mounted between a pair of frame plates 15 and 16 and includes a belt 17, a drive roller 19, a roller 20 at the input and, tensioning rollers 21 and 22, drive assisting rollers 24 and 25, a roller 26 adjacent the conveyor 12, a noser roller 27, and a roller 29 which moves with the noser roller 27. The noser arrangement 11 includes (in addition to the rollers 27 and 29) a carriage 30, slideably mounted between the frame plates 15 and 16, on which the rollers 27 and 29 are mounted.

The drive roller 19 is driven by a motor 31 assembly through a chain 32 which is tensioned by a spring loaded arm 35 acting the chain through a sprocket 34 mounted on the arm. A blade 36 is mounted between the rollers 24 and 26 to scrape clean the surface of the belt 17. The motor assembly 31 is a conventional unit including an electric motor and a variable speed transmission of the adjustable pulley type, wherein the effective diameter of a split pulley is adjusted by changing the relative axial position of the pulley halves. The split pulley is adjusted manually by means of a hand crank.

As shown best in FIGS. 3, 6 & 7, the carriage 30 includes a pair of longitudinal beam members 37 interconnected by transverse bar 38 and a transverse beam 39. A photoelectric unit 40 is attached to the bar 38 to count the number of articles which are transferred in one column. A pair of rods 41 are mounted to the inner surface of the frame plates 15 and 16 by means of brackets 42, one at each end and one in the middle of each rod. A sliding bearing 44 is attached to the upper surface of each end of each of the members 37. The rods 41 extend through the bearings 44 to support the carriage.

The noser roller 27 is journalled at each end in a formation 45 attached to the lower surface of the output end of each of the beam members 37. A horizontal bar 46 also extends between the formations 45 and is positioned between the upper flight of the belt 17 extending to the noser roller from the input roller 20 and the lower flight of the belt 17 which extends from the noser roller to the roller 29.

The roller 29 is journalled at each end to a formation 47 attached to the lower surface of the input end of each beam member 37. The formations 47 are each formed with an element 49 having a tongue 50 that is secured to the links of a driven chain 51 positioned on each side of the conveyor 10. A thin horizontal plate member 43 is positioned between the upper and lower flights of the noser arrangement extends from the bar 46 toward the formations 47. The plate member 43 is suspended from the beam members 37 by fingers 48.

Each chain 51 extends around a sprocket 52 and a sprocket 54. The sprockets 52 are mounted on a common shaft 55 on opposite sides of the conveyor 10, and the sprockets 54 are similarly mounted on a common shaft 56. The shafts 55 and 56 are journalled in the frame plate 15, 16 and the shaft 56 extends through the plate 16. A driving pulley 57 is mounted on the end of the shaft 56. The pulley 57 is driven (as best shown in FIG. 8) by an adjustable motor 59 through a gear box 60, a transmission assembly 61 and a belt 62.

The transmission assembly 61 is enclosed by a pair of vertical frame plates 64, 65 extending upwardly from a base plate 66, and a sheet metal cover member 67. An input shaft 69 extends from the gear box 60 and is journalled in the plates 64, 65. An output shaft 70, parallel to the input shaft, is also journalled in the plates 64, 65 and extends through the frame plate 16 parallel to the shaft 56. A belt pulley 71 is mounted on the end of the shaft 70 and the drive belt 62 rides on the pulleys 71 and 57 to supply power to the shaft 56. The input shaft 69 carries a gear 74 and a belt pulley 75, each rigidly connected to the shaft 69. The output shaft 70 carries a gear 76 and a belt pulley 77, each mounted on the shaft 70 on bearings. In FIG. 6, there is shown the bearing 78 on which the pulley 77 is mounted. The gear 76 and the pulley 77 are selectively locked to the shaft 70 by a pair of electro-magnetic clutch mechanisms 79, 80 to determine the direction of rotation of the shaft 70.

The clutch mechanisms are of conventional construction and, as shown in FIGS. 6, 8 and 9, each include an armature section 81 having a winding 82 mounted on an annular support 84 which is journalled on the shaft by a bearing 85. A plate 86 is fastened to the support 84 and has an arm 87 extending between the plates 64 and 65 to hold the armature section 81 from rotating. Alongside of the armature section 81 is a clutch element 90 which is rigidly attached to the shaft 70 to rotate therewith. Alongside of the clutch element 90, a second clutch element 91 is mounted to the belt pulley 77 to rotate therewith. The clutch element 91 includes a slightly flexible disc 92 and an annular member 94 for contacting the clutch element 90. When clutch mechanism 80 is energized, the armature winding 82 produces a magnetic field which pulls the annular member 94 against the element 90 (flexing the disc 92) to lock the pulley 77 to the shaft 70 through the clutch 80. In like manner, when the clutch mechanism 79 is energized, the gear 76 is locked to the shaft 70. The belt pulleys 75 and 77 are interconnected by a belt 95 so that the pulley 77 is constantly being driven in the same direction as the shaft 69. Also, the gears 74 and 76 are always engaged so that the gear 76 is constantly being driven in the direction opposite to that of the shaft 69.

When the clutch 79 is energized, the shaft 56 is rotated clockwise, as viewed in FIG. 7, and the carriage 30 moves to the right retracting the noser arrangement. When the clutch 80 is energized (clutch 79 being deenergized), the shaft 56 is rotated counter clockwise and the carriage moves to the left extending the noser arrangement. As shown on FIG. 3, a limit switch 99 is mounted to the plate 16 to be operated by the carriage 30 when the noser arrangement is fully extended and a second limit switch 100 is mounted to be operated by the carriage when the noser arrangement is fully retracted. An electromagnetic brake 101 is mounted on the shaft 70 to stop the carriage motion upon closing of the limit switch 100.

The electrical power and control circuits are shown in FIG. 12 and are powered from a three-phase alternating current circuit represented by the conductors 102, 103 and 104. The conductors 102, 103 are connected to the primary winding 105 of a stepdown transformer 106 and the secondary winding 107 of the transformer is connected to a pair of supply conductors 109 and 110.

The carriage drive motor 59 is a three-phase motor and is connected to the three-phase line by means of a relay 111 having normally open contacts 111A, 111B and 111C each connecting one input conductor to one of the terminals of the motor. The winding 111W of relay 111 is connected in series with a normally open start switch 112 and a normally closed stop switch 114 between the conductors 109 and 110. A fourth normally open contact 111D of the relay 111 is connected in parallel with the switch 112 to latch in the winding 111W in response to the temporary closing of the start switch 112.

The belt drive motor 31 is likewise a three-phase motor and is connected to the input line by means of a relay 115 having normally open contacts 115A, 115B and 115C, each connecting one input conductor to one of the motor terminals and having a winding 115W.

The winding 115W is connected in series with a normally open start switch 116 and normally closed stop switch 117. A fourth relay contact set 115D is connected across the start switch 116 to latch in the relay 115 in response to a temporary closing of the start switch.

The speed of operation of the carriage drive motor 59 is governed by an eddy current clutch 119 which is under the control of an operational amplifier 120. The operational amplifier 120 has three control leads 120A, 120B, 120C and the effect which the amplifier 120 has upon the eddy current clutch 119 is dependent upon the setting of a potentiometer which is connected between the leads 120B and 120C with the adjustable contact connected to lead 120A.

In the present invention, two potentiometers 121 and 122 are alternately connected to the amplifier to provide different carriage speeds in the forward and reverse directions. A relay 124 having a winding 124W and, two sets of dual position contacts 124A and 124B switches the potentiometer controlling the amplifier 120. Each of the contact sets have normally closed contacts connecting the potentiometer 121 to the amplifier when the winding is not energized and have normally open contacts which connect the potentiometer 122 to the amplifier when the winding is energized. The potentiometer 121 controls the speed of the motor 59 as the noser arrangement is extending and the potentiometer 122 controls the speed of the motor 59 when the noser arrangement is retracting. The winding 124W is connected in series with the normally open limit switch 99 between the conductors 109 and 110 to reverse the direction of motion of the carriage when it contacts the limit switch 99.

Actuation of the eddy current clutch 119 is initially prevented by a relay 125 having a set of contacts 125A in series with the clutch 119 and a winding 125W which is connected in series with a normally closed stop switch 127 and a normally open set of contacts 111E of the relay 111 between the conductors 109 and 110. A second set of contacts 125B of the relay 125 are connected acorss the switch 126 to latch the relay 125 after the start switch is initially closed.

The motor 59, the current clutch 119, and the operation amplifier 120 are commercial items sold as a unit by the Eaton Corporation, Kenosha, Wis.

The photoelectric unit 40 includes a lamp unit 129 and a photo cell unit 130 mounted side by side as shown in FIGS. 3 and 7. As shown in FIG. 7, the lamp unit projects a beam of light onto the belt 17 near the noser roll 27 at an angle. The lamp unit and the photo cell unit are oriented so that the light beam is reflected directly into the photo cell from the surface of the belt, however, when an article such as a cookie passes under the unit, the path of the reflected beam is altered because the surface of the article is closer to the unit. The change in the path of the light beam alters the light valve entering the photo cell 130 to indicate the passage of an article.

The photoelectric unit 40 is powered by direct current supplied by a rectifier 131 having its input connected to the conductors 109 and 110, and having output leads 132 and 134. The lamp unit 129 includes a lamp 135, and the photo cell unit 130 includes a photo cell 136 of the variable resistance type. The lamp 135 is connected between the leads 132 and 134, and the photo cell 136 is connected in series with an amplifier 137 between those leads. A relay 138 operates a predetermined counter 139 each time an article passes under the photoelectric unit 40. The relay 138 includes a winding 138W connected to the output of the amplifier 137 and a set of normally open contacts 138A connected in series with the predetermined counter 139 between the leads 132, 134 of the rectifier 131. Each article passing beneath the photoelectric unit causes a pulse at the output of the amplifier 137 which momentarily closes the contacts 138A to send a pulse to the input circuit of the counter 139. The counter has a manual control 140 by which the counter is set for a predetermined count. When the counter 139 has received input pulses equal to the predetermined count, a relay 141 is activated to reverse the direction of movement of the carriage. The relay 141 has a winding 141W connected to the output of the counter 139 and has a set of normally closed contacts 141A.

A relay 142 is provided to keep the relay 124 energized as the noser arrangement retracts. The relay 142 has a winding 142W connected in parallel with the winding 124W and has a set of normally open contacts 142A connected in series with the contacts 141A. The series circuit containing contacts 141A and 142A is connected in parallel with the limit switch 99.

The clutches 79 and 80 receive power from a rectifier 144 having its input circuit connected to the conductors 109 and 110 and having output leads 145 and 146. A pair of potentiometers 149, 150 are connected in parallel, and that parallel circuit is connected in series with a set of normally closed 142B of the relay 142. A set of normally closed limit switch contacts 100A is connected in parallel with the contacts 142B. The clutch 79 is connected in series with a set of normally open contacts 142C between the conductor 146 and the adjustable contact of the potentiometer 149. The clutch 80 is connected in series with a set of normally closed contacts 142D between the conductor 146 and the adjustable contact of the potentiometer 150.

The brake 101 receives power from a rectifier 151 having its input circuit connected to the conductors 109 and 110, and having its output connected to the end terminals of a potentiometer 152. The brake is connected in series with a set of normally open relay contacts 142E and a set of normally open limit switch contacts 100B.

In operation with the conveyor 10 in the condition shown in FIG. 2, the apparatus of the present invention is set in operation by first closing the start button 116 to start the belt drive motor 31, by next closing the start button 112 to start the carriage drive motor 59, and then closing the start button 126 to energize the eddy current clutch 119. The clutch 80 is energized through the normally closed relay contacts and drives the carriage 30 to the left, over the conveyor 12, to extend the noser arrangement 11. The speed control potentiometer 121 is connected to the operational amplifier to set the speed of the carriage so that the noser extends at a speed equal to the speed at which the conveyor 10 is driven by the drive roller 19. During the extension of the noser arrangement 11, no articles are transferred since the noser arrangement extends the conveyor at the same rate that the articles are carried toward the end of the conveyor.

The conveyor 12 is driven at a speed somewhat faster than the rate at which the drive roller 19 drives the belt 10 so that a space is generated on the conveyor 12 during the extension of the noser arrangement as shown in FIG. 2a. When the noser reaches full extension, the limit switch 99 is closed and operates relays 124 and 142. The clutch 80 is de-energized and the clutch 79 is energized (through the operation of the relay contacts 142 and 142D) to drive the carriage 30 toward the right to retract the noser arrangement. The relay 124 switches the speed controlling input circuit of the operational amplifier to the potentiometer 122. The relays 124 and 142 are latched and placed under the control of the predetermined counter 139 by the operation of the contacts 142A. The clutch 79 and the brake 101 are placed under the control of the limit switch 100 by the operation of the contacts 142B and 142E.

As the carriage is driven toward the right to retract the noser arrangement (FIGS. 2b and 2c), articles are transferred from the conveyor 10 to the conveyor 12. As each transverse row of articles moves to the edge of the noser, the article in the longitudinal column passing under the photo unit 40 decreases the amount of reflected light impinging upon the photo cell 136. The voltage pulse thus produced is amplified (by the amplifier 137) and operates the relay 138 to momentarily close the contacts 138A delivering a pulse to the predetermined counter 139. When the counter has counted out the predetermined count, which is the number of articles to be included in each group, the counter energizes the relay 141 to open the contacts 141A and de-energize the relays 124 and 142. The apparatus is now returned to the starting condition and (the counter automatically resets) the noser arrangement again is extended.

If the number of cookies per group is sufficiently large such that the carriage fully retracts before the desired count is reached, the limit switch 100 is operated to de-energize the clutch 79 driving the carriage (by means of contacts 100A) and energizes the brake 101 (by means of contacts 100B) to stop the carriage to prevent damage. The conveyor 10 continues to transfer articles until the predetermined count is reached to start the next cycle.

The articles are passed from the conveyor 12 to a slower moving conveyor (not shown) to shingle the articles (i.e., to partially overlap them) to facilitate the manual loading of the groups into packages.

It will be seen from the foregoing that the present invention provides apparatus for facilitating the hand packaging of articles by receiving columns of articles and automatically counting the articles and arranging the articles into spaced groups, each group containing the same number of articles.

We claim:

1. Apparatus for arranging articles in groups comprising in combination a first conveyor having an input end and an output end and comprising a driven first belt continuously moving from the input end to the output end and an extendable noser arrangement at the output end, means for feeding a column of articles onto the input end of said first conveyor, and a second conveyor comprising a continuously moving second belt parallel with and axially aligned to said first belt for receiving articles from the noser arrangement, noser arrangement driving means including means for retracting the noser arrangement while articles are being transferred onto said second conveyor and means for extending the noser arrangement over the second conveyor at a speed at least equal to the speed of the first belt so that no articles are transferred during the extension thereby producing a space on the second conveyor between groups of articles transferred during successive retractions of the noser arrangement, means responsive to the movement of articles for counting the articles transferred from the noser arrangement to the second conveyor, and means for comparing the number of articles transferred during each retraction with a preselected number and for activating said noser extending means when the number of articles transferred during a retraction equals the preselected number, said noser arrangement including a carriage structure moveable longitudinally with respect to said first conveyor toward and away from said second conveyor between a fully extended position and a fully retracted position, and a noser element, the belt of the first conveyor extending from said input end around said noser element, and said noser arrangement driving means including an endless chain extending longitudinally of said first conveyor and mounted on spaced sprockets, means for linking said carriage to said chain, a first shaft driving said chain, a motor, a second shaft parallel to said first shaft and driven by said motor, a third shaft parallel to said first and second shafts and driving said first shaft, first and second clutches mounted on said third shaft, each clutch having an input member journalled on said third shaft and an output member locked to said third shaft and means for locking the input and output members, gear means connecting said second shaft to one of said input members to drive that member in one direction, and belt means connecting said second shaft to the other of said input members to drive that member in the opposite direction.

2. Apparatus according to claim 1 wherein said first and second clutches are electrically operated, said noser arrangement retracts when said first clutch is energized and extends when said second clutch is energized, said first and second clutches are respectively energized through first and second relay contacts, said first contact being closed when said second contact is open and open when said second contact is closed, and said relay contacts are controlled by said comparing means.

3. Apparatus according to claim 2 including a first limit switch operated by maximum extension of said noser arrangement and a second limit switch operated by maximum retraction of said nose arrangement, said limit switches being connected to also control said relay contacts.

4. Apparatus according to claim 3 wherein said means for counting the articles transferred includes a light source and a photo cell carried by the carriage above the noser arrangement in alignment with a column of articles to detect the passage of individual articles carried by said first conveyor.

* * * * *